United States Patent [19]

Connor

[11] Patent Number: 4,457,503
[45] Date of Patent: Jul. 3, 1984

[54] SUCTION CLAMP

[76] Inventor: Donald R. Connor, 448 Burnet Ave., Syracuse, N.Y. 13203

[21] Appl. No.: 356,795

[22] Filed: Mar. 10, 1982

[51] Int. Cl.³ .............................................. B25B 11/00
[52] U.S. Cl. ........................................ 269/21; 269/91; 248/362
[58] Field of Search ...................... 269/21, 91, 93, 95, 269/246; 248/206 R, 362, 363, 467, 167, 170, 436, 173

[56] References Cited

U.S. PATENT DOCUMENTS

| 418,847 | 1/1890 | Liefer | 269/91 |
|---|---|---|---|
| 1,313,307 | 8/1919 | Locraft | 248/362 X |
| 1,464,279 | 8/1923 | Hindley | 248/167 X |
| 1,659,957 | 2/1928 | Millican | 248/362 X |
| 2,091,050 | 8/1937 | McKechnie | 29/278 X |
| 2,311,525 | 2/1943 | Ebbs | 269/21 |
| 2,464,031 | 3/1949 | Fiedel | 248/167 |
| 2,661,783 | 12/1953 | Caston | 269/91 |
| 2,970,728 | 2/1961 | Haas, Jr. | 248/167 X |
| 3,770,259 | 11/1973 | Wagreich | 269/21 |
| 4,291,866 | 9/1981 | Petersen | 269/95 X |

FOREIGN PATENT DOCUMENTS 545614 6/1942 United Kingdom ................. 269/21

Primary Examiner—Frederick R. Schmidt
Assistant Examiner—Steven P. Schad

[57] ABSTRACT

This suction clamp is for holding moldings in place on front or rear windshields of automobiles, while an adhesive material sets or dries, and it simultaneously prevents damage to the adjacent surface. It consists primarily of an aluminum angle plate, with a pair of suction cups on it to hold it stationary to the windshield, and it further includes a screw clamp for holding the molding in place until it adheres.

1 Claim, 7 Drawing Figures

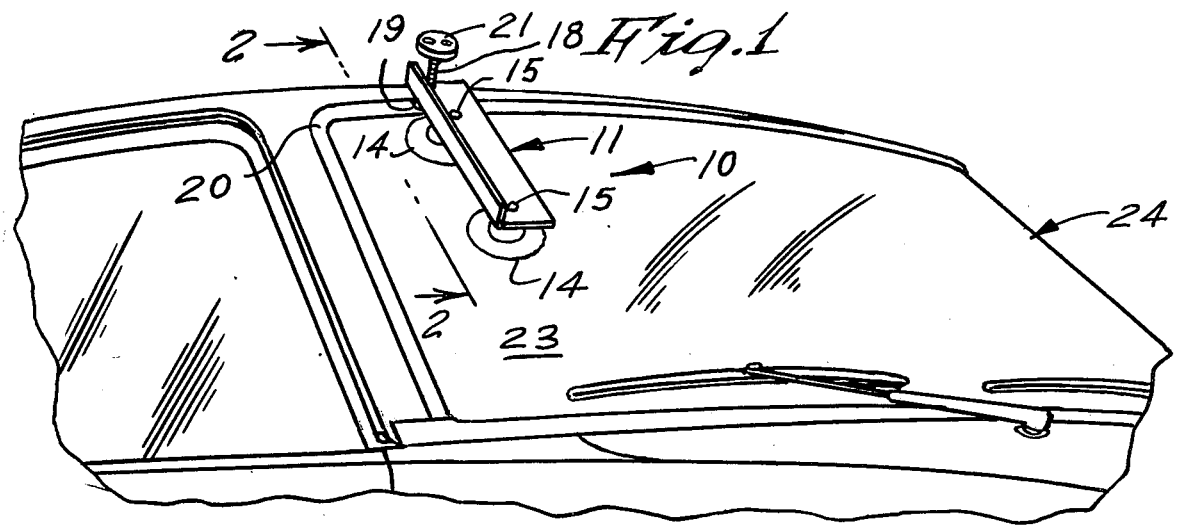
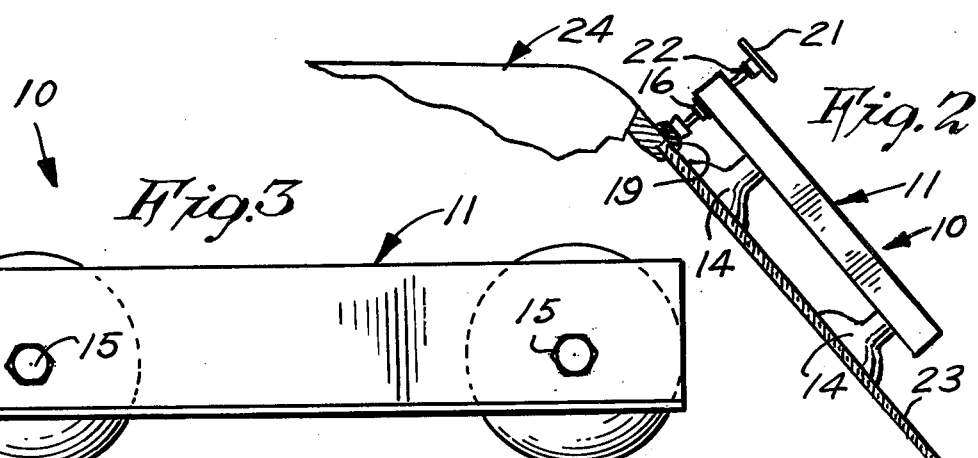
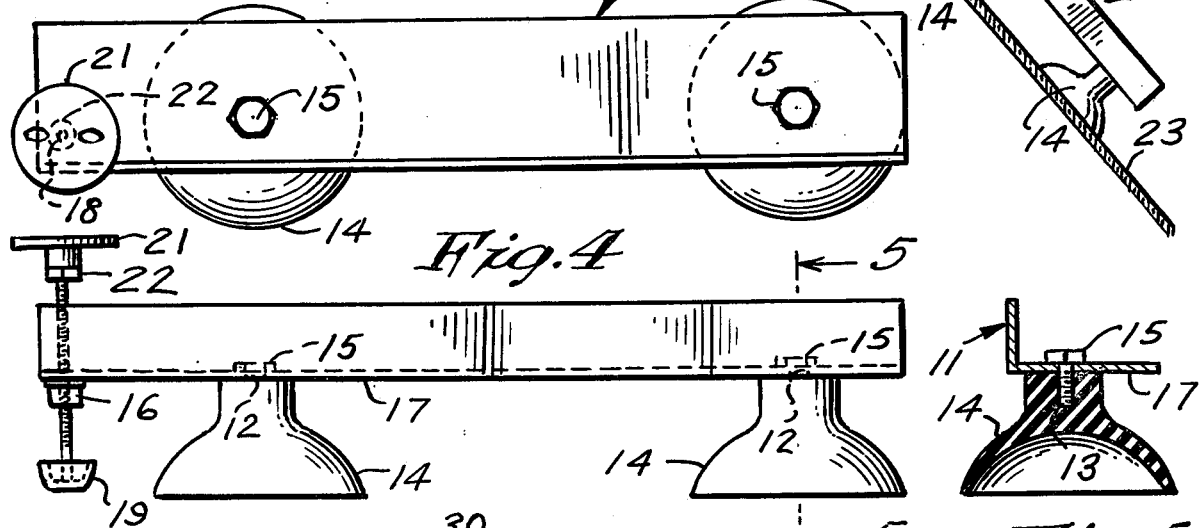
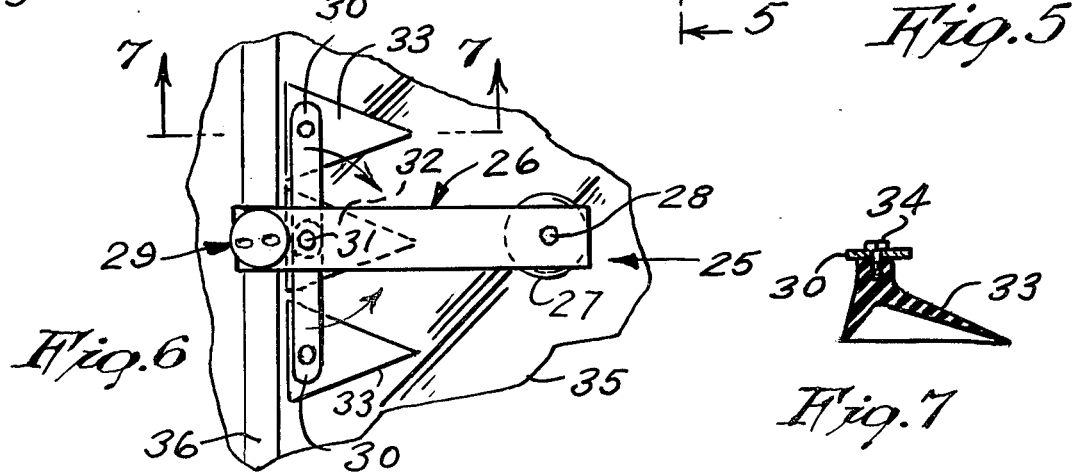

SUCTION CLAMP

This invention relates to clamping devices, and more particularly to a suction clamp.

The principal object of this invention is to provide a suction clamp, which will hold automotive vehicle front windshields or rear window moldings in place, while a bonding material sets or dries, and it also avoids damage to the adjacent surface.

Another object of this invention is to provide a suction clamp, which will be employed to hold side and/or decorative vehicle molding or ornamentation securely in place, while a bonding agent sets.

A further object of this invention is to provide a suction clamp, which will hold an object in place for the purpose of bonding it to another surface, whenever it is required to be held in place for an extended period of time during the bonding process.

Other objects are to provide a suction clamp, which is simple in design, inexpensive to manufacture, rugged in construction, easy to use, and efficient in operation.

These, and other objects, will be readily evident, upon a study of the following specification, and the accompanying drawing, wherein:

FIG. 1 is a perspective view of the present invention, shown in operative use on an automotive vehicle, which is shown fragmentary;

FIG. 2 is an enlarged cross-sectional view, taken along the line 2—2 of FIG. 1;

FIG. 3 is a top plan view of the invention, shown removed from the vehicle, and illustrated on a larger scale;

FIG. 4 is a side elevational view of FIG. 3;

FIG. 5 is a cross-sectional view, taken along the line 5—5 of FIG. 4;

FIG. 6 is a top plan view of a modified form of the invention, and

FIG. 7 is a cross-sectional view, taken along the line 7—7 of FIG. 6.

According to this invention, a clamping device 10 is shown to include a main body 11 of "L"-shaped cross-sectional configuration, which is fabricated of aluminum or other suitable material. A pair of spaced-apart openings 12, through main body 11, receive the metal center studs 13 of suction cups 14, which are secured in main body 11 by receiving a nut fastener 15. An aluminum sleeve nut 16 is fixedly secured to the bottom surface 17 of main body 11 in a suitable manner, and is disposed at one end in alignment with an opening, not shown. An externally threaded bolt 18 is freely received in the opening, and is threadably received in sleeve nut 16, for a purpose which hereinafter will be described. Fixedly secured to the bottom end of bolt 18 is a rubber foot 19, which is employed to prevent damage to the surface of a molding 20 or other article, when clamping device 10 is in use. A plastic knob 21 is threaded onto the top end of bolt 18, and a lock-nut fastener 22 of brass material engages with the bottom of knob 21, so as to render it stationary on bolt 18.

In use, clamping device 10 is placed on the glass 23 of the vehicle 24, with the foot 19 on the molding 20. The user then presses down on the main body 11, which will cause the suction cups 14 to hold device 10 secure on the glass 23. The user then rotates the knob 21, to urge foot 19 downward upon the molding 20, to which a bonding adhesive has been applied. When sufficient pressure has been applied to the molding 20 by the foot 19, the user releases the knob 21, and when molding has been secured, the knob 21 is then rotated in the opposite direction, thereby removing the foot 19 from the secured molding 20, and the suction cups are released from the glass in the manner common in the art.

Referring now to FIGS. 6 and 7 of the drawing, a modified form of clamping device 25 is shown to include a flat main body 26. A suction cup 27 is suitably secured to one end of main body 26 by a fastener 28, and a clamp bolt and knob combination 29 is received on the opposite end of main body 26, and is similar in construction as was heretofore described of device 10. Spaced from the combination 29 are a pair of pivotal bars 30, which are held to the underside of main body 26 by a suitable pivot fastener 31. A centrally disposed and triangularly configurated suction cup 32 is secured stationary on the pivot fastener 31 of main body 26, and a similar pair of suction cups 33 are supported at the extending ends of the pivotal bars 30, by pivot fasteners 34, for holding device 25 to glass 35, so as to hold the combination 29 against the molding 36. As shown in FIGS. 6 and 7, each triangular suction cup is of isosceles shape and the fastener 34 is relatively closer a shorter isosceles base edge thereof than to the other two side edges thereof.

In use, modified device 25 is applied in the same manner as was heretofore described of device 10, with the exception, that device 25 includes pivotal bars 30, so as to enable fitting in the corners of windows, and the suction cups 32 and 34 are triangular in configuration, so as to fit closer to the molding 36.

It shall be noted, that clamping devices 10 and 25 may be suitably employed in fields other than automotive.

While various changes may be made in the detail construction, it is understood that such changes will be within the spirit and scope of the present invention, as is defined by the appended claims.

What I now claim is:

1. A suction clamp, comprising, in combination, an elongated main body, a suction cup secured under one end of said main body by a fastener, a bolt through an opposite end of said main body having a rubber foot on a lower end of said bolt and a knob on an upper end thereof, and a second fastener through said main body being located between said suction cup and said bolt, said second fastener being relatively close to said bolt, a pair of independently pivotable arms on an underside of said main body each being pivoted at one end on said second fastener, and a triangular suction cup under an opposite end of each said pivotable arm while a third triangular suction cup is supported on a lower end of said second fastener, wherein said independently pivotable arms and said triangular suction cups permit positioning of said suction clamp in the corner of windows.

* * * * *